UNITED STATES PATENT OFFICE.

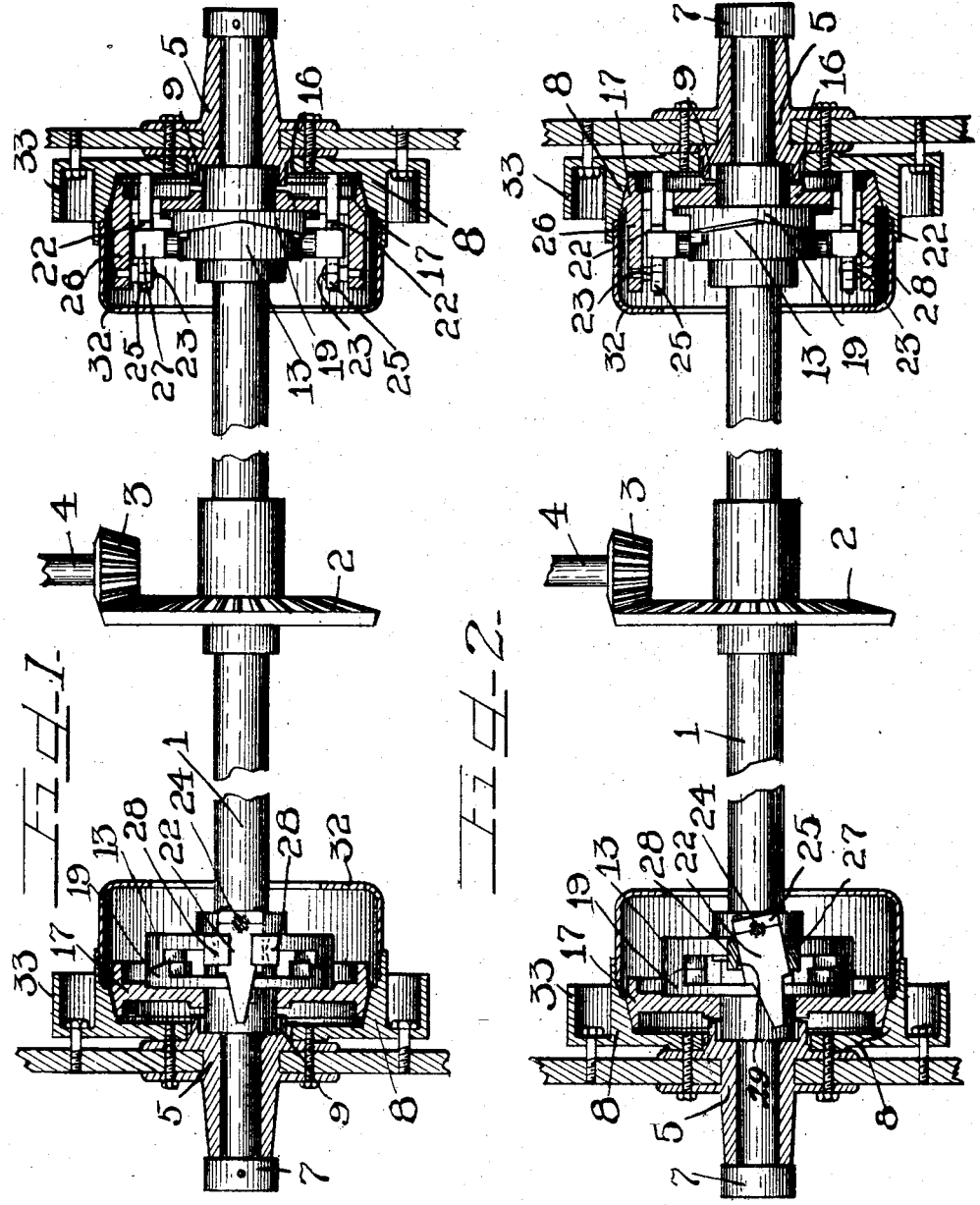

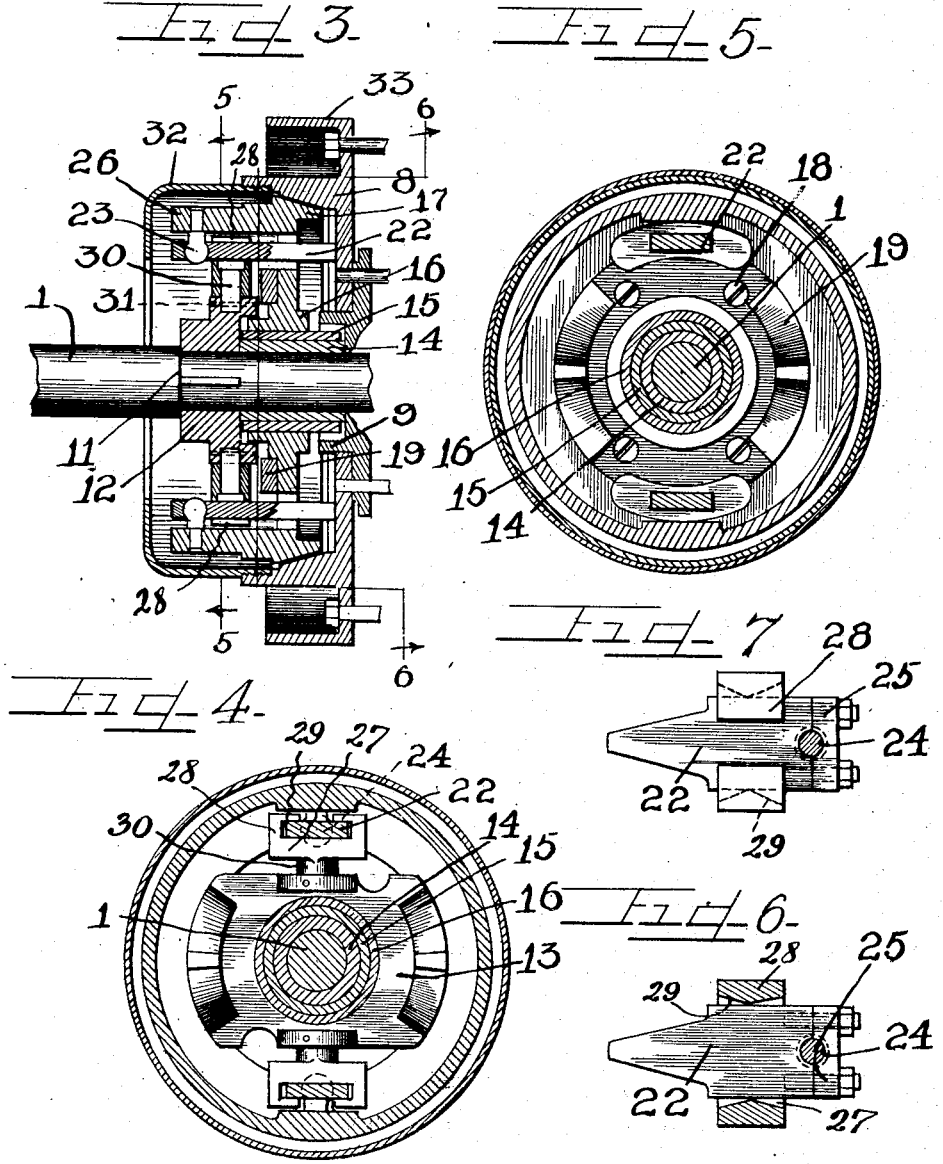

BERNHARD SETTERGREN, OF CHICAGO, ILLINOIS, ASSIGNOR, BY MESNE ASSIGNMENTS, TO JOHN F. GUBBINS, OF CHICAGO, ILLINOIS.

CLUTCH DEVICE FOR AUTOMOBILES AND THE LIKE.

1,274,090.   Specification of Letters Patent.   Patented July 30, 1918.

Application filed January 24, 1913. Serial No. 743,893.

*To all whom it may concern:*

Be it known that I, BERNHARD SETTERGREN, a citizen of the United States, and a resident of the city of Chicago, in the county of Cook and State of Illinois, have invented certain new and useful Improvements in Clutch Devices for Automobiles and the like; and I do hereby declare that the following is a full, clear, and exact description of the same, reference being had to the accompanying drawings, and to the letters of reference marked thereon, which form a part of this specification.

In automobile constructions the vehicles have been propelled either by means of driving chains, usually driving from a jack shaft to the rear wheels or driving direct from the engine to the rear axle—in either case a differential gear is required either in the jack shaft or in the rear axle to enable the wheels to drive without slipping in turning a curve. Wheresoever the differential gear has heretofore been connected in or on the shaft, it has been necessary to construct the shaft in two pieces and at the present time a very considerable item of expense and a very prolific source for expense in repairs is the construction in which a differential gear serves to connect the two axially alined shaft sections which together comprise the rear axle. This is notably true in shaft driven cars and is also true howsoever the cars may be driven. In consequence various types of floating axles (so-called) have been devised, all of which, however, have proven more or less faulty in construction with all of which a weakened construction is afforded because of the use of a differential gear at some part of the structure.

The object of this invention is to afford a clutch construction in which a differential gear is entirely dispensed with and in lieu thereof each of the driving wheels is rotatably secured upon the rear axle or shaft and adapted to be positively engaged by a clutch member also on the shaft so that the drive of the axle may be communicated directly to the wheels without loss or slippage.

It is also an object of the invention to afford a construction such that when either of the wheels on the axle travels at a higher rate than the other, the outer or faster running wheel is released or partly released from its clutch, thus permitting a true differential action of the wheels as in turning a curve.

It is also an object of the invention to afford a clutch construction such that any rotation or partial rotation of the shaft in either direction serves to firmly bind the wheels thereon in a manner to prevent slipping.

It is also an object of the invention to afford a construction in which a powerful frictional clutch is employed to communicate the drive of the axle in either direction to the wheel.

It is finally an object of the invention to afford a construction whereby a positively actuated clutch is provided for each of the rear or driving wheels and which act each independent of, but simultaneously with the other.

The invention consists in the matters hereinafter described and more fully pointed out and defined in the appended claims.

In the drawings:

Figure 1 is a central section of a construction embodying my invention, showing the parts partly in plan and showing the respective hub clutches, both out of action.

Fig. 2 is a similar view showing the hub clutches engaged to positively hold and drive the wheels with the axles.

Fig. 3 is an enlarged section of one of the clutches taken longitudinally of the shaft, showing the shaft in elevation.

Fig. 4 is a section on line 5—5 of Fig. 3.

Fig. 5 is a section on line 6—6 of Fig. 3.

Fig. 6, is a plan view of the adjusting levers, showing the pivot therefor in section.

Fig. 7, is a plan view of one of the adjusting levers.

As shown in the drawings:

1 indicates the rear axle of the automobile, or other power driven vehicle and on which, as shown, is provided a bevel gear 2, driven by a bevel pinion 3, meshing therewith and which in turn is driven directly from the engine shaft 4. Of course, friction wheels may be employed if desired, in lieu of gears.

Rotatable on each end of the rear axle are wheels 5. These are of the usual or any desired construction and as shown, a collar 7, is pinned or otherwise secured on the end of the axle to positively hold the wheel thereon.

Rigidly bolted on the inner side of each wheel concentric therewith are the hub clutch members 8, each, as shown, affording a conical inner peripheral friction face extending inwardly to the inner surface of the central hub portion of said clutch members. A fillet or shoulder 11, is provided near each end of the axle and rigidly secured on the axle on the outer side of the fillet is a collar 12, integral with which is an outwardly facing friction member or cam 13, having oppositely disposed inclined or angular faces on diametrically opposite sides thereof and facing outwardly. Bearing against the end of the hub is a sleeve 14, secured on which is an anti-friction sleeve 15, and rotatably secured on said anti-friction sleeve 15, is a floating clutch member arranged for longitudinal adjustment on the axle and embracing a web 16, and a peripheral inclined face 17, complemental with the peripheral face on the cone member 8, secured to the wheel.

Rigidly secured on the web 16, of said floating friction member by bolts 18 or otherwise, is a friction member or cam 19, complemental with the friction member 13, before described, and having inclined faces complemental therewith and facing the same, and arranged so that when in register the male clutch 16, may lie out of engagement with the female clutch member 8. As shown, links or levers 22, are provided one on each side of the axle and the inner end of which are pivotally engaged on the ball shaped heads 23, of stud bolts 24, by means of a bearing block 25, which is bolted to the lever 22, while the outer ends of said levers 22, project into engagement with the female clutch member 8. Said stud bolts are set in diametrically opposite arms 26, of said floating friction member. As shown, each of said links or levers 22, is engaged by a cam yoke 27, the arms 28, of which are provided with cam faces 29, providing a pivot for said levers 22. Said yokes are swiveled to a stud shaft 30, which is rigidly secured to the collar 12, by pins 31.

The operation is as follows:

The length of said levers or links 22 is such that when the same are arranged parallel the axis or axle, the clutch members 8 and 16 are held out of engagement, as shown in Fig. 1. Movement of the shaft in either direction, at a greater rate than the rate of rotation of the wheel, however, serves to turn the friction member 13 slightly on the complemental friction member 19, the cam faces of which act on one another to force the floating clutch member 16, outwardly away from the friction member 13, and into driving engagement with the clutch member 8. (Of course the levers 22 are shifted out of parallel with the shaft by the movement of the axle relative to the wheel.) The very positive engagement thus assured, permits the delivery to the wheel of all the power imparted to the shaft. When the wheel rotates at a faster rate than the shaft, (as for instance, the outside wheel in turning a corner) the clutch being in engagement with the member 16, is carried by the friction so that the arms 26, carrying the inner extremities of the levers 22, travel faster than the yokes 27, which are rotating with the axle. The levers 22 are then thrown into parallel relation with the shaft by reason of their connection with the inner surface of the clutch member 8, thus moving the floating clutch member 16, inwardly away from the clutch member 8, effecting a temporary disengagement of the clutch members and simultaneously forcing the cam faces of the friction member 19, slightly over the cam faces of the friction member 13, into the position shown in Fig. 1; thus tending to slow down the clutch member 16, to the speed of the axle. But if the wheel 5, is still rotating faster than the axle, the engagement of the end of the lever 22, with the inner face of the clutch 8, would cause the lever to be swung forward, thus permitting the cam faces of the friction members 13 and 19, to move over one another, forcing the floating clutch member outwardly and again permitting a temporary clutching action after which the entire cycle of events enumerated above would be repeated.

In backing, of course, the same effects are produced. The moment the outer end of the lever passes center, the clutches are again brought into engagement, again rigidly securing the wheel upon the axle with the result as before described.

Very trifling stress is applied upon the links or levers 22. The same serve only to push the clutch members out of engagement during the brief interval that the connections of said levers on the floating friction ring are passing center. As shown, a cap 32 is secured to the inner peripheral brake flange of the hub cone cup 8, and extends beyond the fillet or shoulder 11, on the shaft inclosing all the operating parts. Said hub cone cup 8, is also provided with an integral outer peripheral portion 33, apertured to receive bolts for rigidly securing the hub cone cup upon the wheel.

I claim as my invention:

1. The combination with an axle and a wheel rotatable thereon, of a clutch member on said wheel, a second clutch member journaled on said axle adjacent the wheel clutch member, and adapted to positively engage the wheel clutch member when the axle tends to rotate at the same rate as the wheel, levers on said second clutch member engaging said wheel clutch member acting to release said clutch members when there is a differential rotation between the wheel and axle, and means associated with the axle and with said second clutch member acting to shift the second clutch member into engagement with the wheel clutch member when the axle tends to rotate at a higher rate than the wheel.

2. The combination with an axle and a wheel journaled thereon, of a clutch adapted to automatically connect the wheel and axle when both rotate at an equal speed, and pivotally mounted levers adapted to automatically release the wheel from the axle by positive disengagement of the clutch when there is a differential rotation between the wheel and axle.

3. The combination with a driven axle, of a wheel journaled on the end thereof, a clutch member rigidly secured to the wheel, a clutch member journaled on the axle, and pivoted levers on said clutch member adapted to disconnect the last named clutch member from the other clutch member when the axle rotates at a different speed from the wheel.

4. The combination with a driven axle, of a wheel journaled on the end thereof, a clutch member rigidly secured to the wheel, a clutch member journaled on the shaft, mechanism adapted to rigidly connect the last named clutch member with the axle and to force the same to engage the other clutch member when the axle rotates at the same speed with the wheel, levers pivoted on said journaled clutch member and engaging said wheel clutch member, and means engaging said levers adapted to throw the clutch members out of engagement when the wheel rotates at a higher speed than the axle.

5. In a device of the class described, an axle, a wheel journaled on the end thereof, a clutch member connected to the wheel, a complemental clutch member journaled on the shaft, a friction member rigidly connected to the last named clutch member, a friction member rigidly secured on the axle adapted to engage the first named friction member and shift the clutch member journaled on the shaft into engagement with the clutch member connected to the wheel, and mechanisms movably connected to said shaft-journaled-clutch member engaged by said first mentioned clutch member to separate the two.

6. In a device of the class described, an axle, a wheel journaled on the end thereof, a clutch member connected to the wheel, a complemental clutch member journaled on the shaft, a friction member rigidly connected to the last named clutch member, a friction member rigidly secured on the axle adapted to engage the first named friction member and shift the clutch member journaled on the shaft into engagement with the clutch member connected to the wheel, and means pivotally mounted on said shaft clutch member adapted to throw the clutch members out of engagement when said wheel rotates at a greater speed than the axle.

7. In a device of the class described, an axle, a wheel journaled on the end thereof, a clutch member connected to the wheel, a complemental clutch member journaled on the axle, a friction member rigidly connected to the last named clutch member, a friction member rigidly secured on the axle, adapted by rotation of the axle to engage the first named friction member and shift the clutch member journaled on the axle into engagement with the clutch member connected to the wheel, mechanism movably connected to said clutch member journaled on the axle and operated by the wheel to throw the clutch members out of engagement when said wheel clutch member rotates at a greater speed than the axle, a brake flange integral with the clutch member connected to the wheel, and means secured thereto inclosing the operating parts of the device.

8. In a device of the class described, an axle, a wheel journaled on the end thereof, a friction member rigidly secured on the axle, yoked members thereon, a clutch member rigidly secured to the wheel, a combined friction member and clutch member journaled on the axle adapted to engage said clutch member rigid on the wheel to couple the wheel to the axle, and levers pivoted on said combined friction member and engaging said wheel clutch member, said yoked members adapted to engage said levers to actuate the same to disengage said clutch members.

9. In a device of the class described, an axle, a wheel journaled on the end thereof, a clutch member rigidly secured to the wheel, a friction member rigidly secured to the axle, a combined friction member and clutch member journaled on the axle adapted to be actuated by rotation of the friction member rigid on the axle to couple the wheel to the axle, and levers pivotally connected to the combined friction member and clutch member journaled on the axle, said levers extending through slots into the combined friction member and clutch member adapted to be actuated by differential movement of the wheel and axle.

In testimony whereof I have hereunto subscribed my name in the presence of two subscribing witnesses.

BERNHARD SETTERGREN.

Witnesses:
LAWRENCE REIBSTEIN,
CHARLES W. HILLS, Jr.

Copies of this patent may be obtained for five cents each, by addressing the "Commissioner of Patents, Washington, D. C."